United States Patent [19]
Kwon

[11] Patent Number: 5,861,926
[45] Date of Patent: Jan. 19, 1999

[54] DEVICE AND METHOD FOR CALCULATING A BRIGHTNESS SIGNAL

[75] Inventor: Oh Bong Kwon, Bubaleub, Rep. of Korea

[73] Assignee: Hyundai Electronics Industries Co., Ltd., Rep. of Korea

[21] Appl. No.: 884,341

[22] Filed: Jun. 27, 1997

[30] Foreign Application Priority Data

Jun. 29, 1996 [KR] Rep. of Korea ................... 1996 26477

[51] Int. Cl.$^6$ ...................................... H04N 9/77
[52] U.S. Cl. .................... 348/687; 348/712; 348/234; 348/659
[58] Field of Search ..................................... 348/234–238, 348/687, 720, 396, 712, 659, 660; H04N 9/77

[56] References Cited

U.S. PATENT DOCUMENTS 5,220,412  6/1993  Oka ......................................... 348/659
5,313,274  5/1994  Abe ......................................... 348/659

*Primary Examiner*—Nathan Flynn
*Attorney, Agent, or Firm*—Blakely Sokoloff Taylor & Zafman

[57] ABSTRACT

The present invention relates to a digital image processing system, for example, video cameras, digital cameras, cathode ray tubes (CRT) etc. With reference to the calculation of the brightness signal, the main idea of the present invention is to carry out the calculations of it by using only the additions, the subtractions and the shifts, which require relatively short operation times, without the multiplications and divisions by substituting only the shift operations of the digits for them. Also, according to the present invention, high resolution is accomplished by a high speed process in calculating the brightness of an image signal. Also, it enables high speed digital image processing.

11 Claims, 2 Drawing Sheets

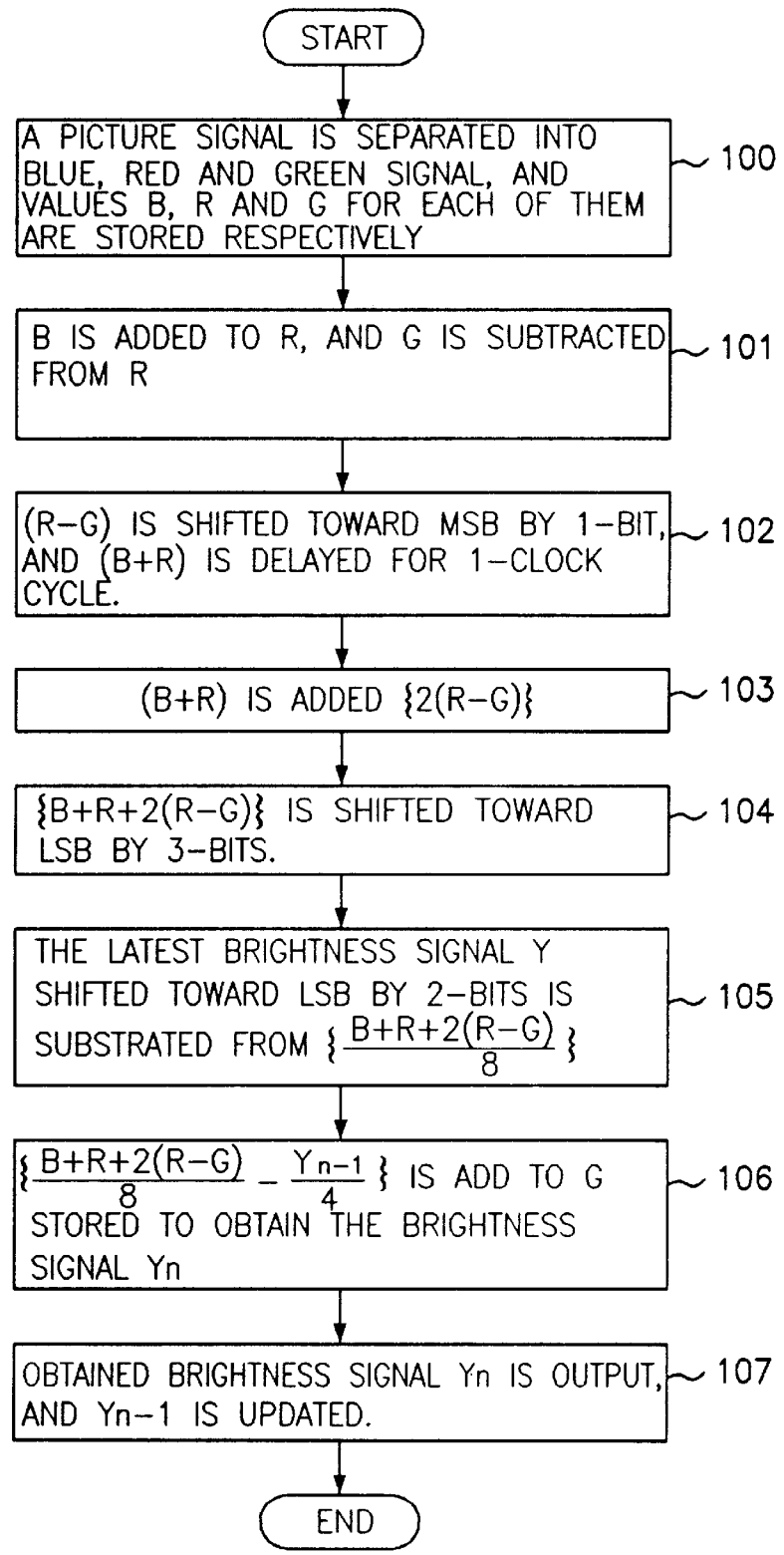

DEVICE AND METHOD FOR CALCULATING A BRIGHTNESS SIGNAL

BACKGROUND OF THE INVENTION

1. Field of the Invention

The present invention relates to the field of a digital signal processing system, and more particularly, to a digital image processing system, such as video cameras, digital cameras, cathode ray tubes (CRT), etc.

2. Description of the Prior Art

In general, a picture signal is separated into a brightness signal and a color signal while it is being transmitted or stored. That is, a color image signal applied to a video camera organizes the brightness signal from the three primary colors of light (red, blue and green).

Conventionally, the devices for calculating a brightness signal have been implemented by using a multiplication circuit, and the general equation (1) for calculating it is as follows:

$$\text{Brightness } (Y) = 0.587G + 0.299R + 0.114B \tag{1}$$

wherein, the parameter G is the value for a green signal of a picture signal, R for a red signal and B for a blue signal. According to equation (1), the calculation of the brightness signal requires the calculation of three or more significant figures to be accurate.

Therefore, the devices for calculating the brightness signal need more bits for calculating than the input bits. Also, it is very difficult to apply them to a system requiring high resolution, such as video cameras, cathode ray tubes, etc., because too much time is required in carrying out the multiplications or divisions.

SUMMARY OF THE INVENTION

Therefore, an object of the present invention is to provide a device and method for calculating the brightness components in a picture signal at a high speed in a system requiring high resolution.

According to an aspect of the present invention, there is provided a device for calculating a brightness signal comprising: a first storing means for storing the value of blue, red and green signals respectively, wherein the three signals are separated from a picture signal; a first adder for adding the value of the blue signal to the value of the red signal applied from the first storing means respectively; a first subtracter for subtracting the value of the green signal from the value of the red signal applied from the first storing means respectively; a first shifting means for doubling the output value of the first subtracting mean; a delaying means for delaying the output of the first adder; a second adder for adding the output of the delaying means to the output of the first shifting means; a second shifting means for making the output of the second adder one eighth; a second storing means for storing the latest brightness signal; a third shifting means for raking the output of second storing means one fourth; a second subtracter for subtracting the output of third shifting means from the output of the second shifting means; and a third adder for adding the output of the second subtracter to the value of the green signal applied from the first storing means, wherein the third adder outputs the brightness and updates the content of the second storing means.

According to another aspect of the present invention, there is provided a method of calculating a brightness signal comprising: a first step of separating a color image signal into blue, red and green signals, and of storing their values respectively; a second step of adding the value of the blue signal to the value of the red signal, and of subtracting the value of the green signal from the value of the red signal; a third step of doubling the subtracted value by using shift of the bits, and of delaying the added value for the shifting time of the subtracted value; a fourth step of adding the shifted value to the delayed value; a fifth steps of making the result of the fourth step one eighth by using shift of the bits, and of making a latest brightness signal one fourth by using shift of the bits; a sixth step of subtracting one fourth of the latest brightness signal from one eighth of the result of the fourth step; and a seventh step of adding the result of the sixth step to the value of the green signal stored in the first step, and of outputting its result, wherein its result updates the latest brightness signal.

BRIEF DESCRIPTION OF THE DRAWINGS

These objects, features and advantages of the present invention will more fully apparent from the description of an embodiment with reference to the accompanying drawings, in which:

FIG. 2 is a flow chart illustrating a method of calculating the brightness signal according to an embodiment of the invention.

DETAILED DESCRIPTION OF THE PREFERRED EMBODIMENTS

Figure 1:
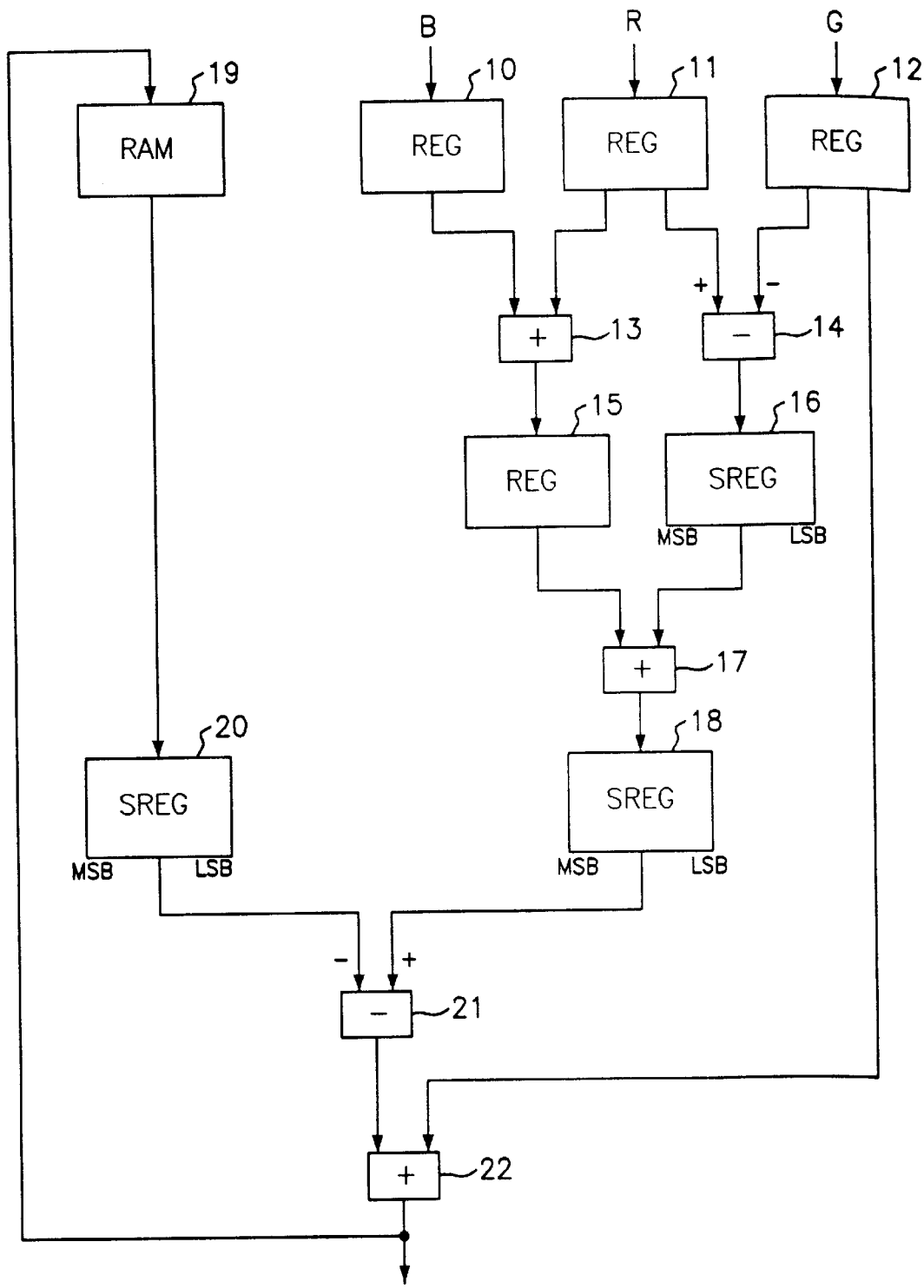
FIG. 1 is a schematic block diagram illustrating a device for calculating a brightness signal according to an embodiment of the invention.

With reference to the calculation of the brightness signals, the main idea of the present invention is to carry out the calculations by using only the additions, the subtractions and the shifts, which take a relatively short operation time to perform such operations, without the multiplications and divisions by substituting only the shift operations of the digits for them.

The equation (1) can be simplified with the equation (2).

$$\text{Brightness } (Y) = 0.6G + 0.3R + 0.1B \tag{2}$$

Also, the equation (2) is substituted for the equation (3).

$$\text{Brightness } (Y) = G + [\{R + B + 2(R-2)\}/8] - Y/4 \tag{3}$$

Also, the equation (3) can be reexpressed as an interactive equation (4).

$$Y_n = G + [\{R + B + 2(R-G)\}/8] - Y_{n-1}/4 \tag{4}$$

wherein, $Y_n$ is the brightness signal being calculated and $Y_{n-1}$ is the brightness signal to have been calculated and stored lately. In the equation (4), "the multiplication two (2)" is performed by one bit-shifting of the value (R−G) toward the most significant bit (hereinafter, referred to as MSB), and "the division four (4)" and "the division eight (8)" are performed by two and three bit-shifting of the value $Y_{n-1}$ and {R+B+2(R−G)} toward the least significant bit (hereinafter, referred to as LSB), respectively.

An embodiment of the present invention will be described in detail with reference to accompanying drawings.

As shown in FIG. 1, first, a picture signal is separated into blue, red and green signals, and then a value B for the blue signal is stored in a first register 10, and a value R for the red signal is stored in a second register 11, and a value G for the green signal is stored in a third register 12.

A first adder 13 adds the value B stored in the first register 10 to the value R stored in the second register 11, and outputs its result to a fourth register 15. A first subtracter 14 subtracts the value G stored in the third register 12 from the value R stored in the second register 11, and outputs its result to a first shift register 16.

The first shift register 16 shifts the output from the first subtracter 14 toward MSB (left) by one bit in order to carry out the multiplication "two (2)" shown in the equation (4), and outputs its result to a second adder 17. Also, the fourth register 15 is used as a delay register, in which it delays the output of the first adder 13 by one clock cycle to ensure the normal operation of the second adder 17.

The second adder 17 adds the value from the fourth register 15 to the value from the first shift register 16 and outputs its result to a second shift register 18. Hence, the output of the second adder 17 corresponds to B+R+2(R−G). The second shift register 18 shifts the output of the second adder 17 toward LSB (right) by three bits in order to for the division "eight (8)" shown in the equation (4), and outputs its result to a second subtracter 21.

On the other hand, a RAM 19 stores $Y_{n-1}$ (that is, the value of the brightness to had been calculated lately), and outputs it to a third shift register 20. Also, the contents of the RAM 19 is updated whenever a new value of the brightness is output from a third adder 22. The third shift register 20 shifts the output of the RAM 19 toward LSB (right) by two bits in order to carry out the division "four (4)" shown in the equation (4), and outputs its result to tho second subtracter 21. Hence, the output of the third shift register 20 corresponds to $Y_{n-1}/4$.

The second subtracter 21 subtracts the output of the third shift register 20 from the output of the second shift register 18, and outputs its result to the third adder 22. The third adder 22 adds the output of the second subtracter 21 to the value G stored in the third register 12, and then outputs the brightness, $G+[\{R+B+2(R-G)\}/8]-Y_{n-1}/4$.

There are two applications regarding the brightness $Y_{n-1}$ stored in the RAM 19. First, the brightness of the pixel of the just previous picture frame is applicable to the brightness $Y_{n-1}$, wherein the pixel has the same coordinate with a pixel being calculated in the present picture frame. Second, the brightness of the pixel having been calculated just before that of being calculated in the same picture frame is also applicable to it. The alternative of them depends on the demand for and the number of repeating times of the interactive calculation of it.

That is, the first method is suitable for a high accuracy and for a decreasing the number of repeating processes. On the other hand, the second method is suitable for a high resolution by means of the repeated calculations leading convergence, although it is in need of high speed calculations. For example, for white balance process of a picture signal, there are needed many times of interactive calculations for every pixel and every picture frame.

As shown in FIG. 2, a method of calculating the brightness is illustrated.

First, a picture signal is separated into blue, red and green signals, and then a value B for the blue signal a value R for the red signal and a value G for the green signal (hereinafter, referred to as just B, R and G) is respectively stored in step 100.

In step 101, B is added to R, and G is subtracted from R. In step 102, the value B+R is delayed for one clock cycle, and the value R−G is shifted towards MSB by one bit in order to carry out the 2(R−G) operation. In step 103, the value B+R is added to the value 2(R−G).

In step 104, the value B+R+2(R−C) is shifted towards LSB by three bits to carry out the {B+R+2(R−G)}/8 operation. In step 105, one fourth of the latest brightness signal $Y_{n-1}/4$ (i.e. just previous brightness signal), for which the latest brightness signal is shifted towards LSB by two bits, is subtracted from the value {B+R+2(R−G)}/8.

In step 106, the value $[\{B+R+2(R-G)\}/8]-Y_{n-1}/4$ is added to G stored. As a result, this step carries out the $G+[\{B+R+2(R-G)\}/8]-Y_{n-1}/4$ operation to obtain the brightness signal $Y_n$.

Lastly, in step 107, the obtained brightness signal $Y_n$ is output and the just previous brightness signal $Y_{n-1}$ stored in the memory is updated.

The same steps mentioned above are repeated for a higher accuracy.

According to the present invention, the high resolution is accomplished by a high speed process in calculating the brightness of a picture signal. Also, it enables high speed digital image processing.

The invention has been described in detail with particular reference to a presently preferred embodiment, but it will be understood that variations and modifications can be effected within the spirit and scope of the invention.

What is claimed is:

1. A device for calculating a brightness signal comprising;
   a first storing means for storing the value of blue, red and green signals respectively, wherein the three signals are separated from a picture signal;
   a first adder for adding the value of the blue signal to the value of the red signal applied from said first storing means respectively;
   a first subtracter for subtracting the value of the green signal from the value of the red signal applied from said first storing means respectively;
   a first shifting means for doubling the output value of said first subtracting means;
   a delaying means for delaying the output of said first adder;
   a second adder for adding the output of said delaying means to the output of said first shifting means;
   a second shifting means for making the output of said second adder one eighth;
   a second storing means for storing the latest brightness signal;
   a third shifting means for making the output of said second storing means one fourth;
   a second subtracter for subtracting the output of said third shifting means from the output of said second shifting mean; and
   a third adder for adding the output of said second subtracter to the value of the green signal applied from said first storing means, wherein the third adder outputs the brightness and updates the content of said second storing means.

2. A device according to claim 1, wherein said first storing means comprises;
   a first register for storing the value of the blue signal;
   a second register for storing the value of the red signal; and
   a third register for storing the value of the green signal.

3. A device according to claim 1, wherein said first shifting means comprises a shift register for shifting the output of said first subtracter towards MSB by one bit.

4. A device according to claim 1, wherein said second shifting means comprises a shift register for shifting the output of said second adder towards LSB three bits.

5. A device according to claim 1, wherein said third shifted means comprises a shift register for shifting the output of said second storing means towards LSB two bits.

6. A device according to claim 1, wherein said delaying means comprises a register for delaying the output of said first adder for one cluck cycle.

7. A device according to claim 1, wherein said second storing means comprises a RAM.

8. A method of calculating a brightness signal comprising:
- a first step of separating a color image signal into blue, red, and green signals, and of storing their values respectively;
- a second step of adding the value of the blue signal to the value of the red signal, and of subtracting the value of the green signal from the value of the red signal;
- a third step of doubling the subtracted value by using shift of the bits, and of delaying the added value for the shifting time of said subtracted value;
- a fourth step of adding the shifted value to the delayed value;
- a fifth step of making the result of the fourth step one eighth by using shift of the bits, and of making a latest brightness signal one fourth by using shift of the bits;
- a sixth step of subtracting one fourth of said latest brightness signal from one eighth of said result of said fourth step; and
- a seventh step of adding the result of said sixth step to the value of the green signal stored in the first step, and of outputting its result, wherein its result updates said latest brightness signal.

9. A method according to claim 8, wherein said doubling in said third step is implemented by using one bit-shift register shifting towards MSB.

10. A method according to claim 8, wherein said making the result of said fourth step one eighth in said step is implemented by using three bit-shift register shifting towards LSB.

11. A method according to claim 8, wherein said making a latest brightness signal one fourth in said fifth step is implemented by using two bit-shift register shifting towards LSB.

* * * * *

UNITED STATES PATENT AND TRADEMARK OFFICE
CERTIFICATE OF CORRECTION

PATENT NO. : 5,861,926
DATED : January 19, 1999  PAGE 1 OF 2
INVENTOR(S) : Kwon It is certified that error appears in the above-identified patent and that said Letters Patent is hereby corrected as shown below:

In column 1, line 50, delete "the first subtracting mean" and insert -- the first subtracting means --.

In column 1, line 55, delete "means for raking the output" and insert -- means for making the output --.

In column 2, line 6, delete "a fifth steps" and insert -- a fifth step --.

In column 2, line 30, delete "the brightness signals" and insert -- the brightness signal --.

UNITED STATES PATENT AND TRADEMARK OFFICE
CERTIFICATE OF CORRECTION

PATENT NO. : 5,861,926
DATED : January 19, 1999          PAGE 2 OF 2
INVENTOR(S) : Kwon It is certified that error appears in the above-identified patent and that said Letters Patent is hereby corrected as shown below:

In column 3, line 25, delete "tho second subtracter" and insert -- the second subtracter -- .

In column 4, line 46, delete "second shifting mean" and insert -- second shifting means -- .

In column 4, line 66, delete "said third shifted means" and insert -- said third shifting means --.

Signed and Sealed this

Eighteenth Day of July, 2000

Attest:

Q. TODD DICKINSON

Attesting Officer        Director of Patents and Trademarks